US009110639B2

(12) United States Patent  
Ries et al.

(10) Patent No.: US 9,110,639 B2  
(45) Date of Patent: Aug. 18, 2015

(54) POWER SUPPLY CONTROL ACROSS INDEPENDENTLY POWERED MODULES IN A STORAGE LIBRARY

(75) Inventors: James Lee Ries, Erie, CO (US); Frank T. Smith, Nederland, CO (US); Jon Mark Holdman, Wheat Ridge, CO (US)

(73) Assignee: ORACLE INTERNATIONAL CORPORATION, Redwood City, CA (US)

(*) Notice: Subject to any disclaimer, the term of this patent is extended or adjusted under 35 U.S.C. 154(b) by 472 days.

(21) Appl. No.: 13/558,209

(22) Filed: Jul. 25, 2012

(65) Prior Publication Data

US 2014/0032946 A1    Jan. 30, 2014

(51) Int. Cl.  
*G06F 1/26* (2006.01)  
*G06F 1/18* (2006.01)

(52) U.S. Cl.  
CPC .............. *G06F 1/181* (2013.01); *G06F 1/189* (2013.01)

(58) Field of Classification Search  
CPC ................................ G06F 1/181; G06F 1/189  
USPC .................................................. 713/310, 340  
See application file for complete search history.

(56) References Cited

U.S. PATENT DOCUMENTS

| 6,421,782 | B1 * | 7/2002 | Yanagisawa et al. ............. 726/4 |
| 7,971,085 | B2 * | 6/2011 | Kim ............................... 713/324 |
| 8,261,001 | B2 * | 9/2012 | Bobrek .......................... 710/310 |

\* cited by examiner

*Primary Examiner* — Thuan Du  
(74) *Attorney, Agent, or Firm* — Marsh Fischmann & Breyfogle LLP; Daniel J. Sherwinter (57) ABSTRACT

Embodiments include systems and methods for controlling power distribution and supply across independently powered modules in a storage library. Embodiments operate in context of a data storage library having a base module and one or more expansion modules. Each expansion module is independently powered, and each is in communication with the base module via a powered data communications network. In some embodiments, when the base module power supply is on, a base controller in the base module provides network power over the powered data communications network. The network power causes expansion controllers in each expansion module to boot up and power on the power supplies of their respective modules. When the base module is powered down, power is no longer available to the expansion controllers, and the respective power supplies can be hard-coded to shut down automatically under that condition.

18 Claims, 5 Drawing Sheets

POWER SUPPLY CONTROL ACROSS INDEPENDENTLY POWERED MODULES IN A STORAGE LIBRARY

FIELD

Embodiments relate generally to data storage systems, and, more particularly, to controlling power to modules in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

In some storage libraries, cartridge magazines and/or drives are arranged in structural modules, and some storage libraries allow the modules to be added, removed, and/or rearranged. Proper functioning of the library may involve distributing and controlling power delivery to the modules. For example, some traditional library implementations gang together direct current (DC) power outputs across the modules in a distributed power arrangement. To help ensure that all the modules turn on and off together (i.e., that a single main power switch can control power to all the modules), traditional implementations also include dedicated control lines connected to each power supply.

BRIEF SUMMARY

Among other things, embodiments provide novel systems and methods for controlling power distribution and supply across independently powered modules in a storage library. Embodiments operate in context of a data storage library having a base module and one or more expansion modules. Each expansion module is independently powered (e.g., each has zero, one, or two power supplies for running its operational components, like tape drives, or the like), such that each provides its own primary DC power as needed. Each expansion module is in communication with the base module via a powered data communications network. For example, each expansion module includes a USB interface that is coupled with a USB interface of the base module using a standard USB cable. In some embodiments, when the base module power supply is on, a base controller in the base module provides network power over the powered data communications network. The network power causes expansion controllers in each expansion module to boot up and power on the power supplies of their respective modules. When the base module is powered down, network power is no longer available to the expansion controllers, and the respective power supplies can be hard-coded to shut down automatically under that condition.

According to one set of embodiments, a data storage system is provided. The data storage system includes a base module and one or more expansion modules. The base module includes: a base power supply; a powered data communications network; and a base controller, in communication with the base power supply and the powered data communications network, and operable to provide power to the powered data communications network when in a powered on state. Each expansion module includes: a network interface; and an expansion controller, in communication with the expansion power supply and the network interface, and operable to receive first power via the network interface, thereby powering up the expansion controller when the base controller is in the powered on state.

According to another set of embodiments, a method is provided. The method includes: receiving first power at an expansion controller of the expansion module from the powered data communications network, the first power being available from the powered data communications network only when a base controller of the base module is in a powered on state; and booting up the expansion controller in response to receiving the first power. Some such methods further include: toggling the base controller of the base module to the powered on state; powering up the base power supply in response to toggling the base controller of the base module to the powered on state; and powering up the powered data communications network in response to toggling the base controller of the base module to the powered on state. Other such methods further include executing a module power up sequence that powers up an expansion power supply of the expansion module automatically in response to booting up the expansion controller, the power up sequence providing second power to operational components of the expansion module.

According to yet another set of embodiments, an expansion controller is provided that is disposed in an expansion module of a data storage system and is in communication with an expansion power supply of the expansion module and with a powered data communications network that couples the expansion module with a base module having a base power supply and a base controller. The expansion controller has a tangible, non-transient storage medium with instructions stored thereon, which, when executed, cause the expansion controller to perform steps. The steps include: receiving first power via from the powered data communications network, the first power being available from the powered data communications network only when the base power supply is powered on; and executing a power up sequence that powers up the expansion power supply in response to receiving the first power, the power up sequence comprising providing second power to operational components of the expansion module.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
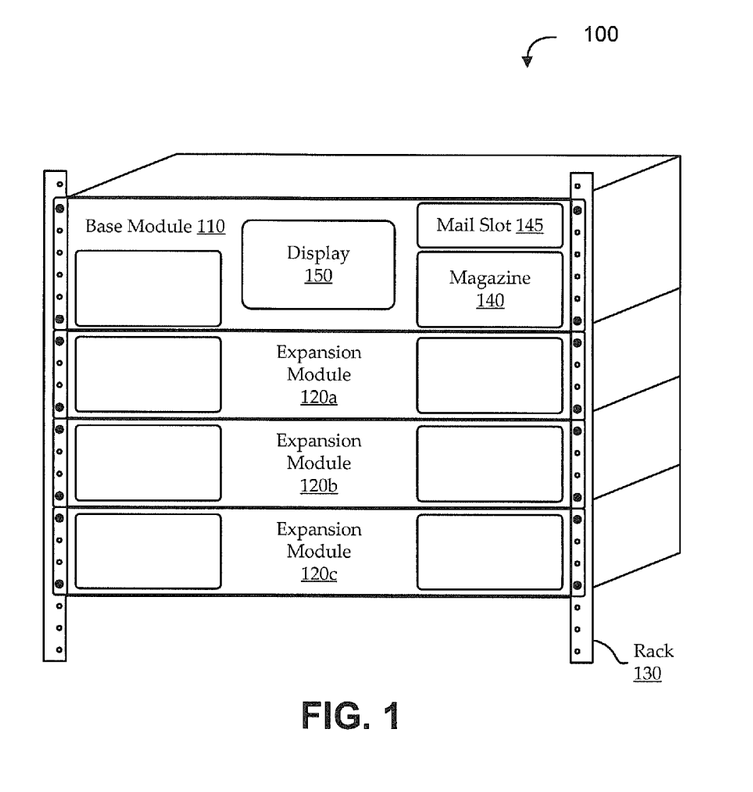
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

Figure 2A:
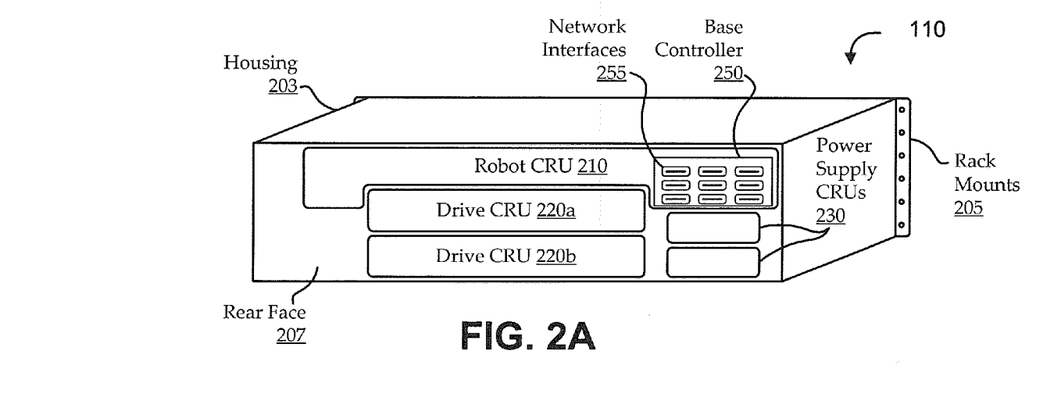
FIGS. 2A and 2B show rear and front views, respectively, of an illustrative base module, according to various embodiments.
Figure 2B:
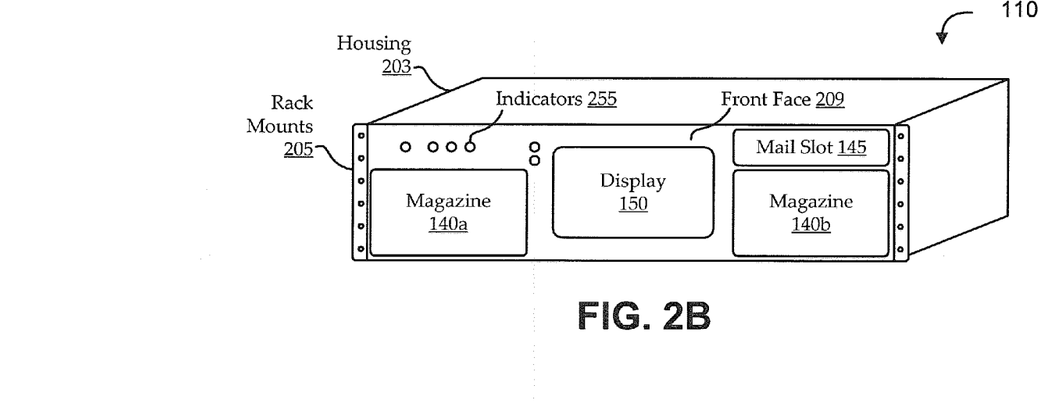

FIGS. 2A and 2B show rear and front views, respectively, of an illustrative base module 110, according to various embodiments. The illustrative base module 110 may be an implementation of base module 110 of FIG. 1. As shown, the base module 110 includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110, are designed to facilitate customer serviceability. Accordingly, most of the replaceable components are shown as accessible from the front and rear exterior of the base module 110, which would be substantially exposed when mounted in a standard equipment rack.

Looking at the rear view of the base module 110 in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110, so that media cartridges can only be inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110 and or to any other components (e.g., to one or more expansion modules 120 (not shown)). For example, the power supply CRUs 230 can include power generators, power converters, power conditioners, back-up batteries and/or other power duplication, switches, input and/or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110 has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110 has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110 has at least one power supply, even if no drives are included, to support the main processor, interface functionality (e.g., the display 150), etc.

Embodiments of the base module 110 include a base controller 250. In some implementations, the base controller 250 is part of the robot CRU 210. In other implementations, the base controller 250 is implemented as its own module or as part of another CRU of the base module 110. Embodiments of the base controller 250 include a main processor (e.g., a central processing unit (CPU), or any suitable processor) and one or more peripheral interface controller (PIC) microcontrollers or the like. In one embodiment, the base controller 250 includes four microcontrollers: two microcontrollers for operating motors and for monitoring motion sensors; a third microcontroller for interfacing with drive CRUs 220, power supply CRUs 230, and various position sensors; and a fourth microcontroller for interfacing between touch screen events and graphics display (e.g., via display 150) on the operator panel back and the main processor.

Embodiments of the base module 110 also include network interfaces 255. The network interfaces 255 can be any suitable type of interfaces for any type of network. For example, the network interfaces 255 can be physical and/or logical ports for interfacing with a universal serial bus (USB) network, Ethernet ports for interfacing with an Ethernet network, Firewire ports, optical ports, Bluetooth ports, WiFi ports, etc. As will be described in more detail below, some embodiments are facilitated by communications via a powered data communications network. In those embodiments, at least a portion of the network interfaces 255 are operable to interface with the powered data communications network. For example, a standard USB Type A cable has four pins, including one designed to carry 5V power. Accordingly, the USB cables can be used to carry 5V power from each network interface 255 of the base module 110 to a corresponding network interface of an expansion module 120, as discussed below. The same USB cable can also facilitate data communications between the base module 110 and expansion modules 120.

Looking at the front view of the base module 110 in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, IO functions, service and diagnostic functions, etc. In one implementation, the display 150 is a seven-inch, front-mounted, touchscreen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user ejects the mailslot 145 from the base module 110 and is presented with a number of cartridge slots (e.g., four "Import/Export cells" ("I/E cells")). The user can then insert cartridges into, or remove cartridges from, these slots without interfering with robotic mechanism's operations. In some implementations, the robotic mechanism is used to activate a latch internal to the base module 110, thereby allowing the user to remove the mailslot 145 only when the robotic mechanism is in an appropriate condition (e.g., parked in the robot CRU 210). Certain embodiments having data partitions (as discussed above) only allow one partition at a time to make use of the mailslot 145.

Figure 3A:
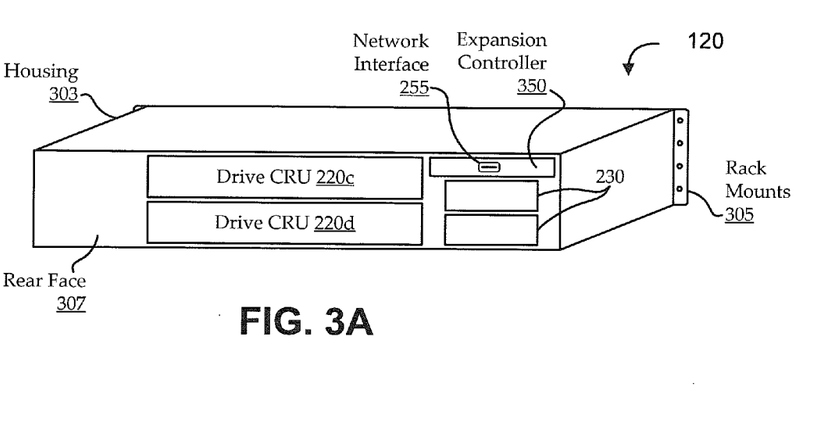
FIGS. 3A and 3B show rear and front views, respectively, of an illustrative expansion module, according to various embodiments.
Figure 3B:
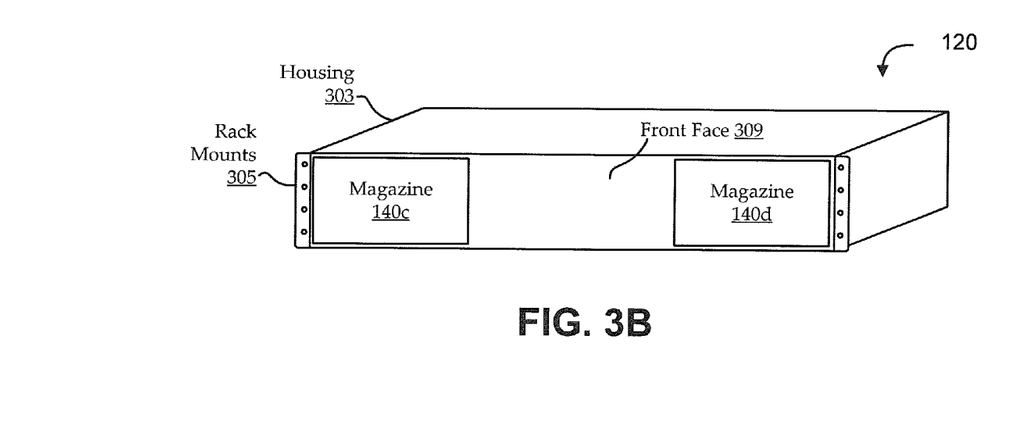

FIGS. 3A and 3B show rear and front views, respectively, of an illustrative expansion module 120, according to various embodiments. The illustrative expansion module 120 may be an implementation of expansion module 120 of FIG. 1. As shown, the expansion module 120 includes a housing 303 (e.g., a chassis) configured with rack mounts 305 for mounting to an equipment rack (e.g., as shown in FIG. 1). A rear face 307 and a front face 309 are also shown as part of the housing 303. As with the base module 110 of FIGS. 2A and 2B, the expansion module 120 is designed to facilitate customer serviceability. Most of the replaceable components are shown as accessible from the front and rear exterior of the expansion module 120, which would be substantially exposed when mounted in a standard equipment rack.

In the embodiment shown, various aspects of the expansion module 120 are similar or identical to the base module 110. For example, embodiments of the expansion module 120 do not typically have a robot CRU 210, display 150, or mailslot 145, as they are configured to exploit that functionality from the base module 110 components. However, like the base module 110, the expansion module 120 includes one or more drive CRUs 220 and one or more power supply CRUs 230 configured to be accessed from the rear side of the expansion module 120, and one or more magazines 140 configured to be accessed from the front side of the expansion module 120. In some embodiments, the drive CRUs 220, power supply CRUs 230, and/or magazines 140 of the expansion module 120 are the same as those implemented in the base module 110.

Because of the lack of certain features in embodiments of the expansion module 120 (e.g., there may be no robot CRU 210, no main processor, etc.), expansion module 120 power requirements may be different from those of the base module 110. In certain implementations, the expansion modules 120 still have slots for two power supplies (e.g., two power supply CRUs 230), which can be implemented as the same power supplies used in the base module 110 (e.g., to avoid having to support or source multiple types of power supplies). The expansion power supplies (i.e., the power supply CRUs 230) can be standard or custom power supplies. In one embodiment, each power supply is designed with an input voltage of 100-250 VAC at 50-60 Hz, and an output voltage of 12 VDC switched plus 5 VDC standby power. These voltages may be chosen to run up to two tape drives in the expansion module 120 and/or other operational components. However, the power supplies of the base module 110 may provide more power than is needed to run configurations of the expansion modules 120. For example, a single power supply may be able to support an expansion module 120 even with two drives, and it is possible to implement an expansion module 120 with no drives and no power supplies. Alternatively, two power supplies may still be used, for example, to provide redundancy.

Some embodiments of the expansion modules 120 include an expansion controller 350. The expansion controller 350 may be similar to the base controller in some implementations, though other implementations may use an expansion controller 350 with appreciably less functionality than that of the base controller 250. The expansion controller 350 may include one or more microcontroller. In one embodiment, the expansion controller 350 includes a microcontroller for interfacing with the module's drive CRUs 220, power supply CRUs 230, various sensors, and/or other components. As described above, some embodiments of expansion modules 120 have no power supplies and/or drives (e.g., they have only magazines 140 for additional cartridge storage), though some such expansion modules 120 still have expansion controllers 350 for performing various functions (e.g., for detecting and communicating power failures, sensor functions, etc.).

Some embodiments of the expansion modules 120 also include one or more network interfaces 255. The network interfaces may be the same as or different from those of the base module 110. In certain embodiments, the network interfaces 255 facilitate communications with the base module 110 via a powered data communications network (e.g., a USB network). For example, the base module 110 has nine USB type A ports and each expansion module 120 has one USB type A port. A USB cable couples the USB port (i.e., the network interface 255) of each expansion module 120 with one of the network interfaces 255 of the base module 110. In this illustrative configuration, there can be up to nine expansion modules 120 in a fully expanded system. Embodiments are configured so that the order that these expansion modules are connected does not affect the system. For example, software of the data storage library (e.g., running on the main processor of the base controller 250) will determine the logical and/or physical order of expansion modules (e.g., their respective logical bus locations) during a discovery phase after the library is powered up.

Various techniques can be used for power distribution in the library. For example, network power (e.g., 5 VDC power) is provided by the powered data communications network via the network interfaces 255 and is sufficient to run the expansion controller 350 (e.g., a microcontroller). However, the network power may be insufficient to run the tape drives and/or other operational components of the expansion module 120. The additional power is provided by the power supply CRUs 230 of the expansion module 120 when they are available and powered on.

In one embodiment, 12V power is distributed throughout the library. Where 5V or 3.3V power is needed, DC-to-DC converters are used to convert from 12V to the lower voltage. Standby 5V power is brought only to the base controller 250, and the power supply CRUs 230 of the base module 110 are coupled with a main power switch. When the library is off, and the main power switch is pressed, one or more base power supply CRUs 230 turn on (e.g., or the base controller 250 directs the base power supply CRUs 230 to power up). When the library is on, and the main power switch is pressed, the base controller 250 directs a power down sequence. As discussed above, low-level power (e.g., network power) can be distributed to the expansion controllers over the powered data communications network (e.g., USB connections). This low-level power can then be used to boot up the expansion controller 350, which can direct one or both of the expansion module's 120 power supply CRUs 230 to turn on for providing higher-level power.

Figure 4:
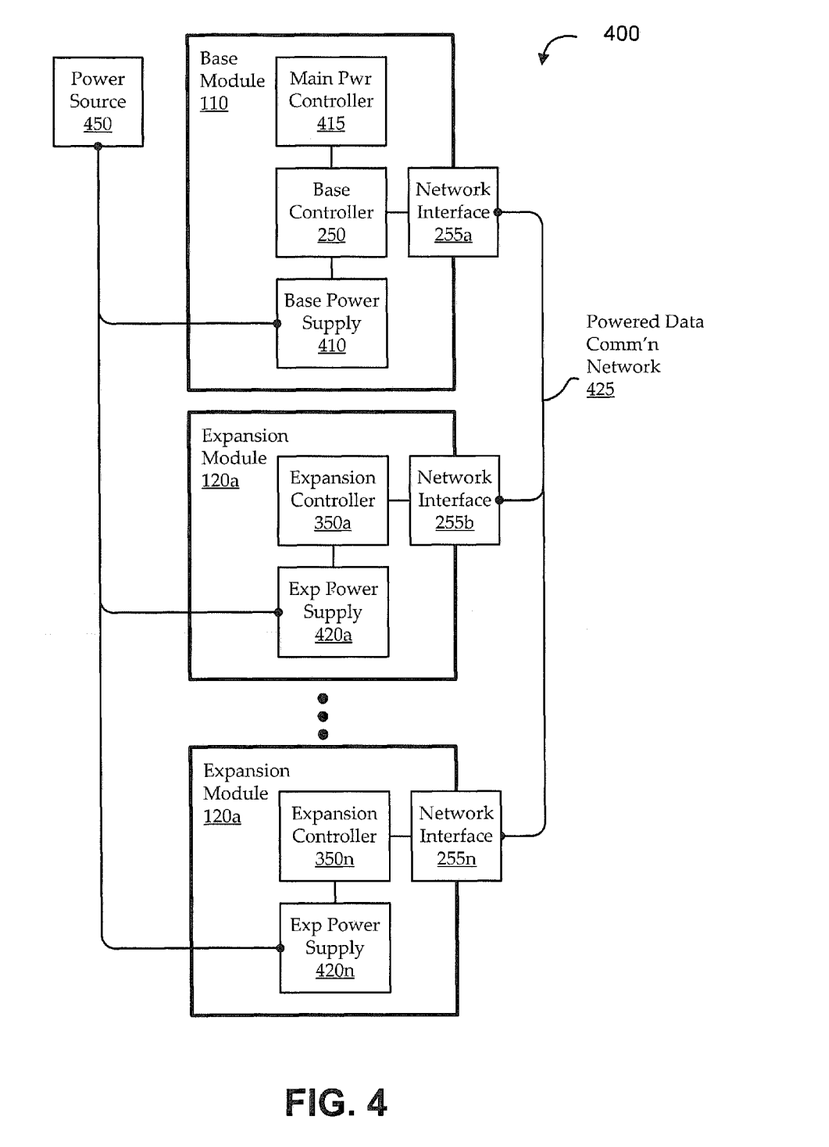
FIG. 4 shows a simplified functional block diagram of an illustrative data storage system, according to various embodiments.

FIG. 4 shows a simplified functional block diagram of an illustrative data storage system 400, according to various embodiments. The data storage system 400 includes a base module 110 and multiple expansion modules 120. As described above, the modules can be configured to hold magazines with data cartridges, to support robotic mechanism operations, to hold one or more tape drives and/or other operational components, etc.

Embodiments of the base module 110 include a base controller 250, a base power supply 410, and network interfaces 255. The base controller 250 can include one or more processors (e.g., a main CPU and one or more microcontrollers). The base power supply 410 can include one or more power supplies (e.g., which can be implemented as one or more power supply CRUs 230 of FIG. 2A. The base power supply 410 is electrically coupled with a power source 450. For example, a power cord electrically couples the base power supply 410 with line power (e.g., via a wall outlet, a plug strip of an equipment rack, etc.). The base power supply 410 may convert the line power to 12 VDC power or any other suitable power for use by the data storage system 400.

Embodiments of the base module 110 have a number of different interfaces, including a number of types of network interfaces 255. According to some embodiments, as least some of the network interfaces 255 are operable to interface with a powered data communications network 425. As will be described more fully below, the powered data communications network 425 can be used to facilitate distribution of low-level (e.g., network) power to the expansion modules 120. In some implementations, the powered data communications network 425 also facilitates data communications between modules. The powered data communications network 425 can be implemented in various ways. In some embodiments, the powered data communications network 425 is a USB or other powered data bus implemented as a component of the base controller 250. The network interfaces 255 act as interfaces to the bus. For example, the powered data communications network 425 can generally refer to the bus, bus interfaces, and any interconnections (e.g., USB cables and the like).

As illustrated, each expansion module 120 can include an expansion controller 350 and a network interface 255. The expansion controller 350 includes one or more microprocessors (e.g., microcontrollers) and/or other components for handling data from, communications with, and/or other functions relating to the sensors, drives, and/or other devices of the expansion modules 120. For example, a sensor in an expansion module 120 is monitored by circuitry and/or software, and data from the sensor is processed by the expansion controller 120 and/or communicated to the base controller 250 (e.g., via the powered data communications network 425) for processing.

Some embodiments of the expansion modules 120 include one or more power supplies (e.g., power supply CRUs), illustrated as the expansion power supply 420. The expansion power supplies 420 are electrically coupled with the same or a different power source 450 from that coupled with the base power supply 410. For example, each expansion power supply 420 can be configured to convert line power to 12 VDC power or any other suitable power for use by operational components of the expansion module. As discussed above, some functionality of the expansion modules 120 can be performed using only low-level power, like the network power received over the powered data communications network 425, without additional power from an expansion power supply 420. For example, the expansion controller may be able to perform functions on the low-level (e.g., network) power, such as power failure detection, sensor handling, certain data communications, etc. However, operation of higher-power devices, such as media drives and the like, may rely on availability of sufficient power from the expansion power supply 420.

The base module 110 and expansion modules 120 are configured to facilitate distributed power supply control across the library, even for expansion modules having their own expansion power supplies 420, without ganging the power supplies together. In some embodiments, the base controller 250 includes a main power controller 415 that has or is in communication with power control circuitry, a basic input-output system (BIOS), and/or the like. The BIOS or other component of the main power controller 415 can be set to maintain a last power supply state, for example, as "ON" or "OFF." When standby power is provided to the base module 410 (e.g., 5 VDC power is brought into the base controller 250 through a DC-to-DC converter), the main power controller 415 wakes up. If the last power supply state is OFF (i.e., the base power supply 410 was turned off prior to power being removed from library), the main power controller 415 will keep the base power supply 410 turned off until instructed otherwise (e.g., by a physical or logical switch). If the last power supply state is ON (i.e., the base power supply 410 was turned on prior to power being removed from library), the main power controller 415 will turn on the base power supply 410. In this way, the system can revert to a previous state after a power interruption.

In some embodiments, the main power controller 415 effectively controls delivery of power over the powered data communications network 425. Standby power wakes up the main power controller 415 in the base controller 250 enough to determine whether to turn on the base power supply 410 (e.g., according to the BIOS 415 settings). For example, if the last power supply state is OFF, the base controller 250 keeps the base power supply 410 OFF, such that it does not provide power to the powered data communications network 425. If the last power supply state is ON, the base controller 250 turns the base power supply 410 ON, thereby providing power to the powered data communications network 425. In some implementations, whether the system powers up via the main power controller 415 or by a user pressing a power button, the powered data communications network 425 becomes active (e.g., powered) at some time during the base controller 250 boot sequence when the powered data communications network 425 is initialized.

Embodiments of the expansion controllers 350 are configured to boot up (e.g., or otherwise power up) in response to receiving the low-level (e.g., network) power from the powered data communications network 425. For example, when the powered data communications network 425 initializes and is powered, any expansion controllers 350 coupled with the powered data communications network 425 will boot up. In expansion modules 120 having expansion power supplies 420, this can cause the expansion power supplies 420 to power up. For example, the expansion power supplies 420 can be hard-coded to turn on when the expansion controller 350 boots up, or the expansion controller 350 can be configured to instruct the expansion power supplies 420 to turn on as part of a boot-up sequence. In some embodiments, the expansion power supplies 420 are further configured to power down automatically whenever no network power is being provided to a respective expansion controller 350.

For example, a main power switch on the base module 110 is toggled (e.g., pressed) to an ON state. This boots up the base controller 250, causing the base power supply 410 to turn on and network power to be delivered over the powered data communications network 425. Providing the network power over the powered data communications network 425 can cause the expansion controllers 350 of the expansion modules 120 to boot up, which, in turn, can cause any expansion power supplies 420 to turn on. The main power switch on the base module 110 is then toggled to an OFF state. This powers down the base controller 250, removing power from the library. The lack of main power can cause the base power supply 410 to turn off and network power (e.g., via the powered data communications network 425) to no longer be available on the powered data communications network 425. The loss of network power on the powered data communications network 425 can cause the expansion controllers 350 of the expansion modules 120 to power down, which, in turn, can cause any expansion power supplies 420 to power down.

The various system embodiments described above are intended only to illustrate certain inventive functionality and contexts therefor. The system can be varying in many ways without departing from the scope of embodiments, including adding, removing, and/or replacing components. Accordingly, the systems described above can be used for performing functions other than those described herein, and the inventive functions described herein can be performed on systems other than those described above.

Figure 5:
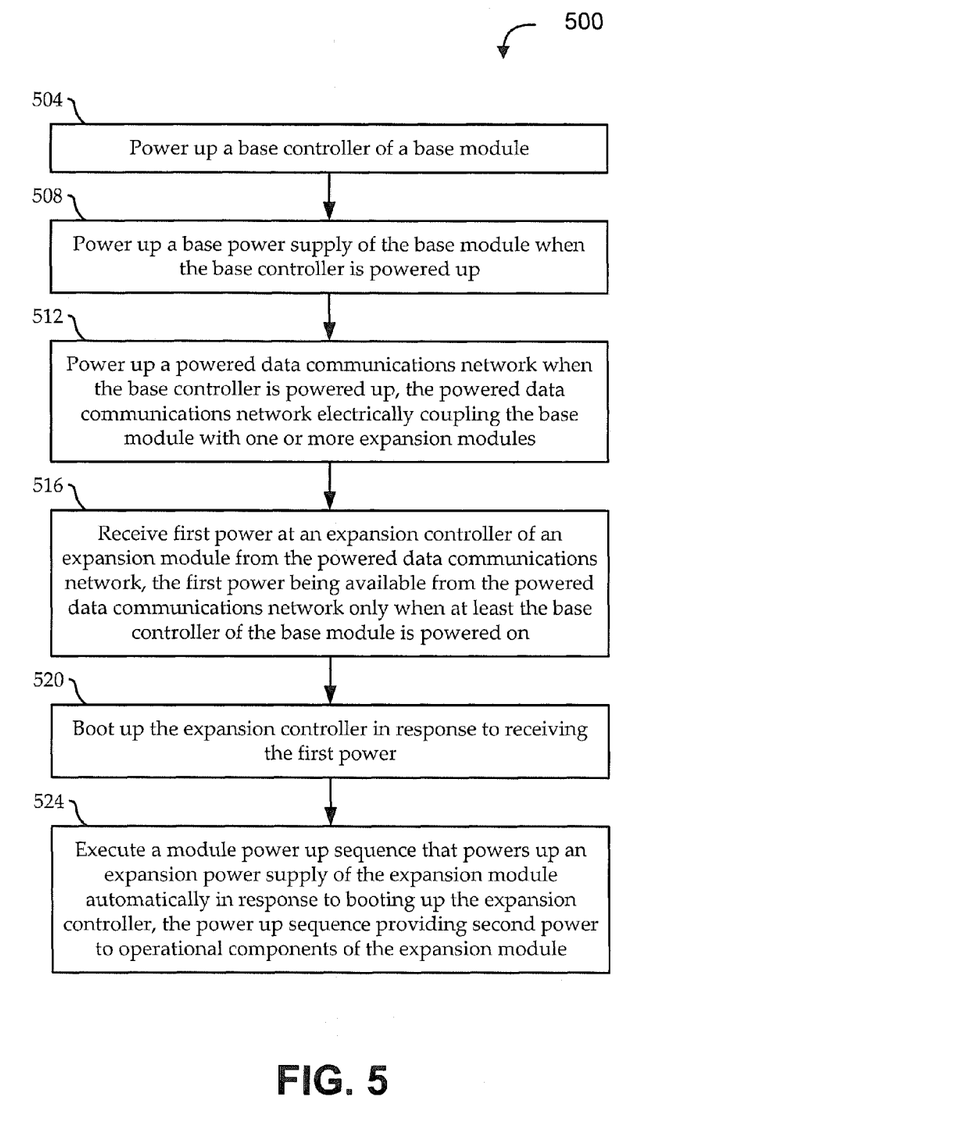
FIG. 5 shows a flow diagram of an illustrative method for distributing power control among independently powered modules according to various embodiments.

Turning to FIG. 5, a flow diagram is provided of an illustrative method 500 for distributing power control among independently powered modules according to various embodiments. Embodiments of the method 500 begin at stage 504 by powering up a base controller of a base module. For example, a main power switch on the base module can be toggled to a power on state, thereby causing circuitry of the base controller to boot up. The base controller may be configured to receive standby power (e.g., from a DC power source, from a power converter coupled with line power, etc.). The standby power allows the base controller to respond to the toggling of the main power switch. In some embodiments, at stage 508, powering up the base controller of the base module causes a base power supply of the base module to power up. In alternative embodiments, the base power supply is turned on first, thereby providing standby power and/or other signaling to the base controller to boot up.

At stage 512, a powered data communications network can be powered up when the base controller is powered up. The powered data communications network is operable to electrically couple the base module with one or more expansion modules. For example, the powered data communications network includes a USB bus, and each of the base module and the one or more expansion modules includes at least one USB interface that allows standard USB cables to interconnect the modules with the bus. When the base controller of the base module is powered up at stage 504, low-level (e.g., network) power can be delivered over the powered data communications network to the expansion modules.

At stage 516, the network power provided over the powered data communications network is received by an expansion controller of each expansion module as first power. For example, the first power is only available to the expansion controllers via the powered data communications network when the base controller is powered up. In some embodiments, the first power is only provided over the powered data communications network and received by the expansion controller when one or more additional trigger events occurs. For example, it may be desirable to wait for the base power supply of the base module to fully power up, which may indicate that the power source supplying power to the base power supply is working properly. Alternatively or additionally, it may be desirable to perform one or more system checks (e.g., internal checks of the robotic mechanism, external network connectivity checks, etc.) prior to powering on the expansion controllers.

At stage 520, the expansion controllers can be powered up (e.g., booted up) in response to receiving the first power at stage 516. For example, the power signal received over the powered data communications network triggers a boot sequence for the expansion controllers. In expansion modules that have expansion power supplies, booting up the expansion controllers can cause a module power up sequence to execute (e.g., run, commence, etc.) that powers up the expansion power supplies at stage 524. For example, the expansion power supplies can be hard-coded to turn on when the expansion controller powers up and to turn off automatically when the expansion controller is not powered up. When the expansion power supply is turned on, it can provide second power to its expansion module's components. For example, some expansion module components (e.g., media drives and the like) can be configured to operate with higher-level power than that available over the powered data communications network. Accordingly, the expansion power supplies can provide the higher-level power.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A data storage system comprising:
a base module comprising:
a base power supply;
a powered data communications network;
a base controller, in communication with the base power supply and the powered data communications network, and operable to provide power to the powered data communications network when in a powered on state; and
one or more expansion modules, each expansion module comprising:
a network interface;
an expansion power supply; and
an expansion controller, in communication with the expansion power supply and the network interface, and operable to:
receive first power from the powered data communications network via the network interface when the base controller is in the powered on state;
power up the expansion controller in response to receiving the first power; and
execute a module power up sequence that powers up the expansion power supply in response to the expansion controller powering up, thereby providing second power to the operational components of the expansion module.

2. The data storage system of claim 1, wherein the first power is low-level power for the expansion controller that is insufficient to power the operational components of the expansion module.

3. The data storage system of claim 1, wherein the base power supply is not electrically coupled with the expansion power supply.

4. The data storage system of claim 1, wherein the expansion power supply is hard-coded to turn on automatically when the expansion controller is powered up and to turn off automatically otherwise.

5. The data storage system of claim 1, wherein the operational components comprise a media drive.

6. The data storage system of claim 1, wherein the base controller is operable to turn on the base power supply when in the powered on state.

7. The data storage system of claim 1, wherein the base controller includes power control circuitry having a basic input-output system (BIOS) that is extended via the powered data communications network to direct each expansion controller.

8. The data storage system of claim 7, wherein the base controller is electrically coupled with a power source and the BIOS of the base controller is operable to control power delivery over the powered data communications network, so that, upon commencing receiving power from the power source after temporarily not receiving power from the power source, the BIOS directs the base controller to:
provide power to the powered data communications network when the powered data communications network was powered up prior to temporarily not receiving power from the power source; and
not provide power to the powered data communications network when the powered data communications network was powered down prior to temporarily not receiving power from the power source.

9. The data storage system of claim 1, wherein the base power supply is electrically coupled with a power source and is operable, upon commencing receiving power from the power source after temporarily not receiving power from the power source, to:
turn on when the base power supply power was turned on prior to temporarily not receiving power from the power source; and
remain turned off when the base power supply power was turned off prior to temporarily not receiving power from the power source.

10. The data storage system of claim 1, wherein the powered data communications network is a powered universal serial bus (USB) and each network interface is a USB interface.

11. A method for controlling modular power in a data storage system having a base module and at least one expansion module coupled via a powered data communications network, the method comprising:
receiving first power at an expansion controller of the expansion module from the powered data communications network, the first power being available from the powered data communications network only when a base controller of the base module is in a powered on state;
booting up the expansion controller in response to receiving the first power; and
executing a module power up sequence that turns on an expansion power supply of the expansion module automatically in response to booting up the expansion controller, the power up sequence providing second power to operational components of the expansion module.

12. The method of claim 11, further comprising:
toggling the base controller of the base module to the powered on state;
powering up the base power supply in response to toggling the base controller of the base module to the powered on state; and
powering up the powered data communications network in response to toggling the base controller of the base module to the powered on state.

13. The method of claim 11, further comprising:
booting up power control circuitry of the base controller in response to toggling the base controller to the powered on state; and
determining, according to BIOS of the power control circuitry, whether to deliver the first power over the powered data communications network,
wherein the first power is received at the expansion controller only when it is determined to deliver the first power over the powered data communications network.

14. The method of claim 13, wherein determining, according to the BIOS of the power control circuitry, whether to deliver the first power over the powered data communications network comprises:
maintaining by the BIOS a last state of the base controller as either the powered on state or a powered off state, the last state indicating whether the base controller was in the powered on state or the powered off state when source power was last removed from the base module;
delivering the first power over the powered data communications network when the last state of the base controller is the powered on state; and
not delivering the first power over the powered data communications network when the last state of the base controller is the powered off state.

15. The method of claim 11, wherein the first power is low-level power for the expansion controller that is insufficient to power the operational components of the expansion module.

16. The method of claim 11, wherein the expansion power supply is configured to be powered down unless the expansion controller is powered up.

17. The method of claim 11, further comprising:
electrically coupling the expansion module with the powered data communications network via a network interface without electrically coupling the expansion power supply with the base power supply.

18. An expansion controller disposed in an expansion module of a data storage system, in communication with an expansion power supply of the expansion module and with a powered data communications network that couples the expansion module with a base module having a base controller, the expansion controller having a tangible, non-transient storage medium with instructions stored thereon, which, when executed, cause the expansion controller to perform steps comprising:
receiving first power via from the powered data communications network, the first power being available from the powered data communications network only when the base controller is in a powered on state; and
executing a power up sequence that powers up the expansion power supply in response to receiving the first power, the power up sequence comprising providing second power to operational components of the expansion module.

* * * * *

UNITED STATES PATENT AND TRADEMARK OFFICE
CERTIFICATE OF CORRECTION

| | |
|---|---|
| PATENT NO. | : 9,110,639 B2 |
| APPLICATION NO. | : 13/558209 |
| DATED | : August 18, 2015 |
| INVENTOR(S) | : Ries et al. |

It is certified that error appears in the above-identified patent and that said Letters Patent is hereby corrected as shown below:

Specification

In column 4, line 62, delete "and or" and insert -- and/or --, therefor.

In column 6, line 24, delete "and or" and insert -- and/or --, therefor.

Signed and Sealed this
Twenty-first Day of June, 2016

Michelle K. Lee
*Director of the United States Patent and Trademark Office*